April 27, 1943.  D. SAMIRAN  2,317,407
FUEL COCK
Filed July 21, 1941  4 Sheets-Sheet 1

INVENTOR
DAVID SAMIRAN
BY
ATTORNEYS

April 27, 1943.　　　D. SAMIRAN　　　2,317,407
FUEL COCK
Filed July 21, 1941　　　4 Sheets-Sheet 2

INVENTOR
DAVID SAMIRAN
ATTORNEYS

April 27, 1943.　　　　D. SAMIRAN　　　　2,317,407
FUEL COCK
Filed July 21, 1941　　　　4 Sheets-Sheet 3

INVENTOR
DAVID SAMIRAN
BY
ATTORNEYS

Patented Apr. 27, 1943

2,317,407

UNITED STATES PATENT OFFICE 2,317,407

FUEL COCK

David Samiran, Fairfield, Ohio

Application July 21, 1941, Serial No. 403,375

20 Claims. (Cl. 251—90)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in valves, particularly of the type employed for connecting any one of a plurality of sources of fuel, such as the fuel tanks in an aircraft, to a single delivery conduit. A great deal of difficulty has been encountered in valves of this character in eliminating leakage; and where sufficient sealing pressure has been employed to minimize leakage, the torque necessary for operation of the valve has become excessive, causing sticking of the valve and resulting in accidents in aircraft due to the pilot's not being able to operate the valve to connect a full tank to the delivery line. To overcome some of the difficulties encountered with multiple-way valves of this character, disc-type valves have been employed, having a large sealing contact area between the valve seat and the disc valve, the latter being held into sealing engagement with the valve seat by spring force and universally connected to the valve-actuating rod, a typical example being illustrated in United States Patent No. 2,089,943, granted to Daniel Busby. Valves of the type having a spring-loaded valve disc capable of floating movement to maintain sealing contact with the valve seat have not been successful for use in aircraft because of the difficulty of maintaining the spring force normal to the valve disc and still being able to impart rotary movement to the valve.

To overcome the difficulties encountered in the prior art disc valves, the invention departs from previous practice by providing a floating valve seat yieldingly urged into sealing engagement with the disc valve, the latter being supported against cocking or tilting by means of a large annular ball-type thrust bearing, and connected to the valve-actuating rod through a simple screwdriver type of drive. Sealing means are provided of such a character that fluid leakage between the valve seat and the ports in the valve casing is eliminated, yet allowing a limited axial movement of the valve seat relative to the valve casing to maintain a positive sealing contact between the contact faces of the valve and valve seat. The construction in accordance with the invention has resulted in greatly reducing the sealing pressure required between the contact faces of the disc valve and the valve seat and, together with the adequate antifriction thrust support of the valve, has greatly reduced the torque necessary to operate the valve from one position to another. The construction in accordance with the invention also provides for a special sealing mans for preventing leakage when the disc valve is positioned in the "off" position.

The principal object of the invention is the provision, in a valve for controlling the flow of fluid between the inlet and outlet thereof, of a ported valve seat in said valve cooperating with a relatively rotatable valve element, the said valve seat being resiliently mounted in the valve casing to be capable of a floating movement and urged into sealing engagement with the contact surface of the valve element.

Another object of the invention is the provision, in a disc valve, of a valve casing having fluid passages therein, and of a valve seat having ports therein communicating with certain of said passages and resiliently mounted in the valve casing to be urged into sealing engagement with the contact face of a ported valve disc, the latter being supported by means of a thrust bearing to absorb the sealing pressure forces.

A further object of the invention is the provision, in a multiple-way valve of the character described, of a valve casing having a resiliently mounted ported valve seat therein, of a disc-type valve having a single port therein adapted to be rotatably positioned with any one of the ports in the valve seat or positioned to an "off" position, and of a separate seal carried by the valve seat for sealing the port in said valve when the latter is in the "off" position.

Another object of the invention is the provision, in a disc-type multiple-way valve, of a valve casing having fluid inlet passages therein communicating with a central valve chamber, of guide bushings projecting from said fluid passages into the chamber, a ported annular valve seat member in the chamber slidably mounted on the bushings so that the latter project into the ports to serve as guides, a valve-actuating rod projecting through the seat member into the chamber, and a resilient sealing element located between the valve seat member and the valve casing for preventing leakage from the ports in said seat member along the said bushings and also to engage the periphery of said valve-actuating rod to prevent leakage therealong.

A further object is to provide a selector valve wherein a plurality of inlets, one of which is blind for the "off" position, and an outlet, are so associated with a disc that the disc is effectively sealed relative to each of the inlets by an individual tubular piston for each inlet.

Other objects of the invention not specifically noted above will appear by reference to the detailed description in the specification and to the appended drawings, in which:

Fig. 8 is a longitudinal view similar to Fig. 2, illustrating a modified construction of the valve of Fig. 1;

Figure 1:
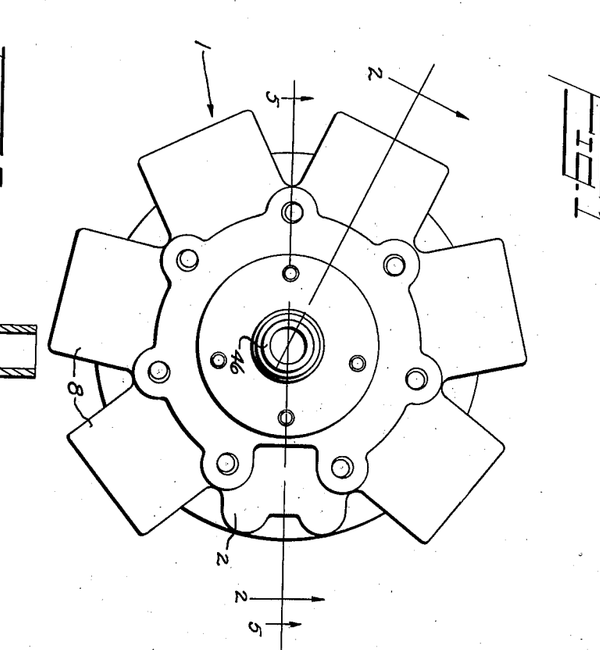
Fig. 1 is a top plan view of a multiple-way valve constructed in accordance with the invention.

Referring now to Fig. 1, the reference numeral 1 generally indicates a multiple-way valve constructed in accordance with the invention and comprising a metal valve casing 2 provided with a plurality of radially disposed cylindrical bosses 8 cast integral therewith and serving as inlet communications adapted to be connected to the fuel conduits from respective fuel supply tanks (not shown). A valve rod 46 extends through the upper portion of the valve casing and serves to actuate a disc-type valve, as hereinafter more particularly described.

Figure 2:
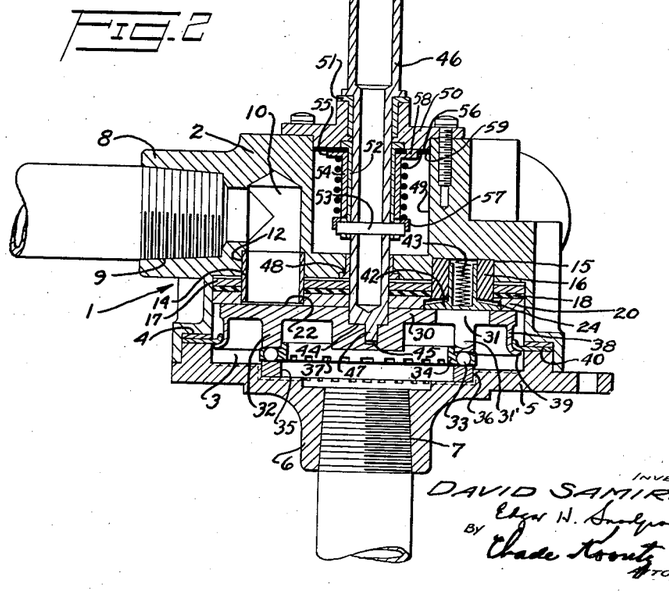
Fig. 2 is a longitudinal sectional view of the valve taken on line 2—2 of Fig. 1, showing the valve element in the "off" position.

Referring now to Fig. 2, the valve casing 2 is seen to be opened at one end thereof and provided with a centrally disposed cylindrical valve chamber 3 which, adjacent its outer end, is counterbored as at 4 to receive the end cover plate 5 which is provided at its center with a boss 6 having a threaded outlet passage 7 centrally disposed therein, and the cover plate is secured by means of suitable screws to the main body of the valve casing 2. As previously noted, the valve casing is provided with a plurality (as shown, six in number) of cylindrical bosses 8 which are each provided with threaded inlet passages 9 extending into the valve body and communicating with passages 10 vertically disposed within the valve casing and communicating with the valve chamber 3. Each of the passages 10, adjacent its lower end, is counterbored as at 12 to receive an annular bushing 14 which projects into the valve chamber 3. The valve casing 2 is also provided with a blind aperture 15 to receive an annular bushing 16 which also projects into the valve chamber 3, the bushing 16 being located in the "off" position of the disc valve, as hereinafter more fully described. (See also Fig. 4.) An annular pressure plate 17 made of metal or the like and provided with suitable openings is slidably mounted on the bushings 14 and 16, respectively, the pressure plate being in engagement with a similarly constructed resilient packing or sealing element 18 made of synthetic rubber or other composition not attacked by gasoline. The sealing element 18 is adapted to closely engage the periphery of the respective bushings 14 and 16 to prevent any leakage therealong. An annular valve seat 20 pierced by ports 22, which respectively register with the bushings 14, and provided with a circular opening 24, which registers with the bushing 16, is slidably arranged for axial movement on the respective bushings 14 and 16, the bushings respectively projecting partially through the ports 22 and the opening 24. The valve seat member 20 seats upon the resilient sealing member 18 and is axially movable relative to the bushings to a limited extent, but is restrained by the bushings from any rotation relative to the valve casing 2, a sufficient clearance being provided, however, that the valve seat may partake of a limited floating movement relative to the valve casing, the sealing member 18 preventing any leakage from the ports 22 and opening 24 upward along the respective bushings 14 and 16.

Figure 3:
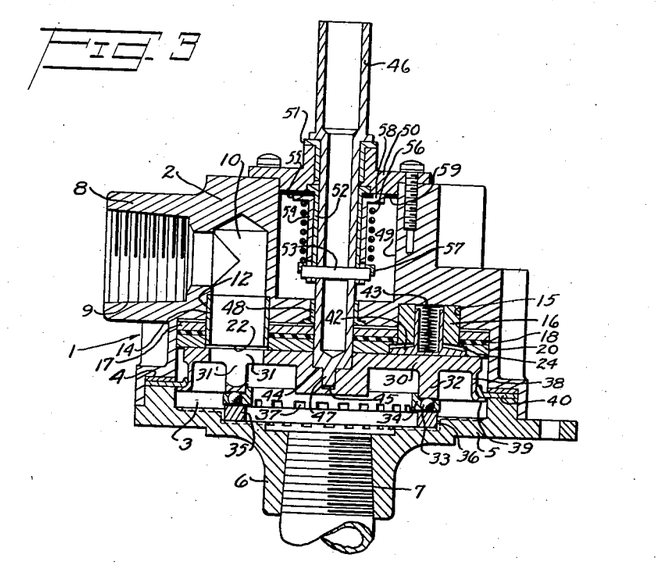
Fig. 3 is a view similar to Fig. 2 but showing the valve element rotated to permit fluid flow therethrough.
Figures 4, 5, 6, 7:
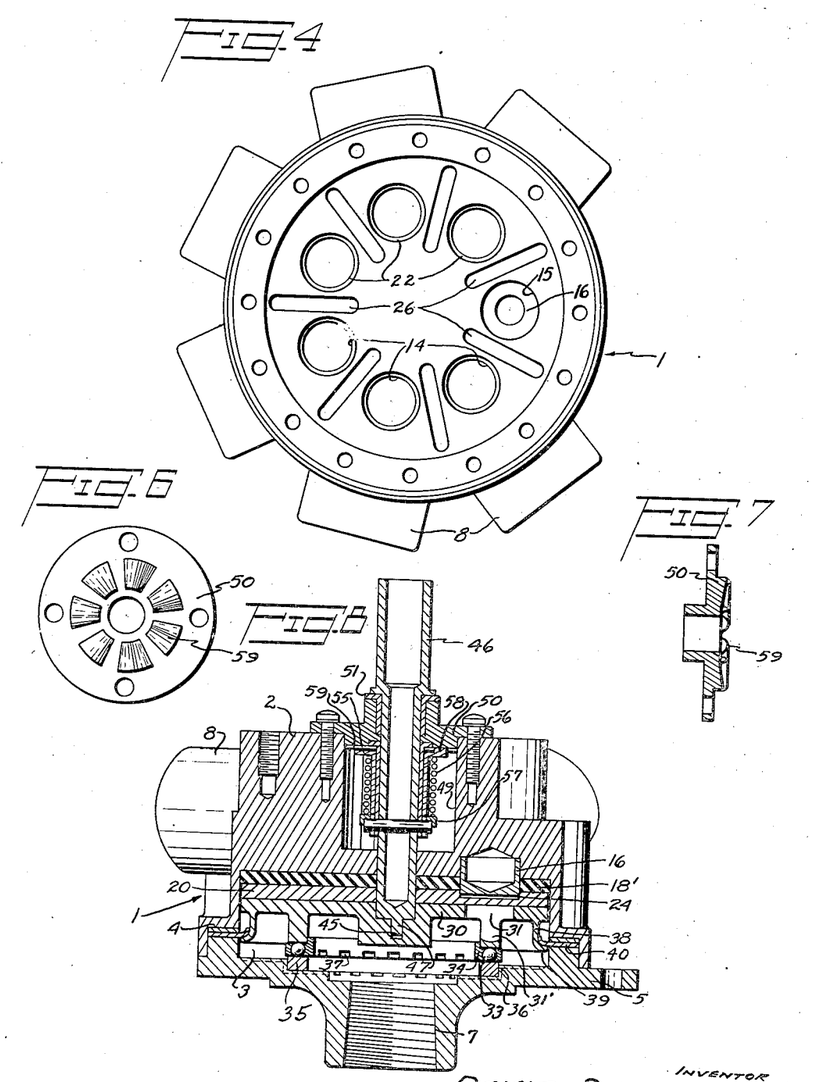
Fig. 4 is a bottom view of the valve of Fig. 1 with the cover plate and disc valve removed.
Fig. 5 is a longitudinal sectional view taken on line 5—5 of Fig. 1.
Figs. 6 and 7 are views illustrating details of the detent mechanism of the valve of Fig. 1.
Figure 5:
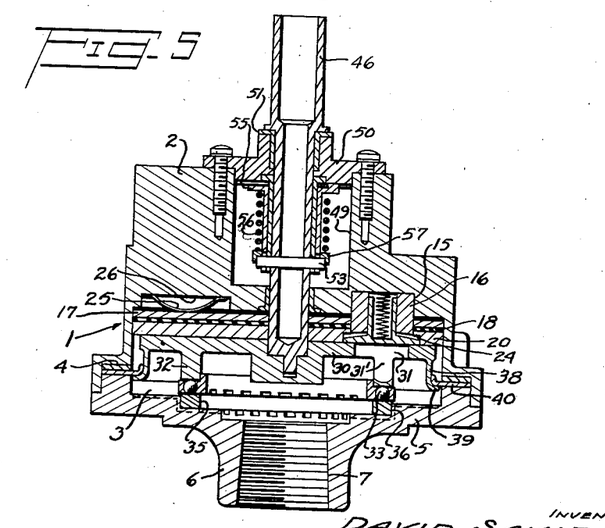

The valve seat member 20 is adapted to be resiliently restrained against axial movement by means of flat leaf-type springs 25 disposed in shallow rectangular depressions 26 formed in the valve casing (see Figs. 4 and 5). The springs are dispoed radially with respect to the longitudinal axis of valve chamber 3 and apply a downward force on to the pressure plate 17, which transmits the force through the resilient sealing element 18 to the valve seat member 20, urging the latter into sealing relation with a circular disc-type valve 30. The contact faces of the valve seat member 20 and the disc valve 30 are carefully ground and lapped together prior to assembly so as to minimize any leakage along the contact faces thereof. The disc valve 30 is provided with a single circular port 31 which is adapted to be placed in communication with any one of the fluid inlet ports 22 in the valve seat member 20, or to be moved into a position directly beneath the opening 24 in the valve seat member 20 corresponding to the "off" position of the valve, as seen in Fig. 2. The port 31 allows fluid flow from any one of the inlet passages 9 and 10 and ports 22 into the valve chamber 3 from whence the fluid is discharged through the opening 7, as illustrated in Fig. 3. The valve 30 is provided with an annular shoulder 32 on its under side, which has its median plane located at a radial distance from the axis of the chamber 3 equal to the radial distance of the center lines of the respective inlet passages 10 and annular bushings 14 and bushing 16, and the shoulder 32 is cut away directly beneath the port 31 as at 31' to allow a free fluid flow through the port. The annular shoulder 32 is adapted to engage the balls 33 of an annular thrust bearing, the balls being held in proper spaced relation by means of a rotatable cage 34 and contacting an annular race 35 on their lower sides, the race being pressed into a counterbore 36 formed in the cover plate 5. The thrust bearing comprising the elements 32, 33, and 35 serves to maintain the valve 30 in fixed horizontal alignment and also serves to absorb all thrust forces such as due to sealing pressure between the contact forces of the valve seat member 20 and the disc valve 30, and minimizing the frictional forces required to rotate the valve to its various adjusted positions. The ball cage 34 is provided with a plurality of slotted openings 37 which permit the free drainage of fluid from the portion of the valve chamber 3 beyond the thrust bearing radially inward to the outlet passage 7. The valve disc 30 adjacent its outer periphery is provided with an annular shroud 38 which terminates in an outwardly directed flange portion 39 which is adapted to be in contact on its upper side with the edge of an annular sealing element 40 disposed in the counterbore portion 4 of the casing 2 and adapted to prevent leakage of fluid from within the chamber 3 between the casing 2 and cover plate 5.

With disc valves of the character described, trouble is experienced in maintaining the proper seal when the disc valve is rotated into the "off" position, and to minimize such leakage a sealing disc 42 is provided which is housed within the opening 24 in the valve seat member 20 and has a hollow shank portion extending in guiding relation within the annular bushing 16. The sealing disc 42 is preferably made from synthetic rubber or similar composition not attacked by gasoline, and is made larger in diameter than the diameter of the port 31 in the valve 30, and is urged into sealing relation with the face of the valve member 30 by means of a spring 43 so that when the port 31 of the disc valve is indexed to a position concentric with the opening 24 in the valve seat 20, the sealing element 42 will prevent any leakage into the port from between the contact faces of the valve seat and disc valve.

The disc valve 30 is provided with a centrally disposed blind aperture 44 and an eccentrically disposed slot or groove 45 which respectively receive the terminal end of a valve-actuating rod 46 which is provided with the screwdriver projection 47, the latter being received within the groove 45 to transmit a turning torque from the valve rod 46 to the valve 30. By providing the groove 45 and screwdriver projection 47 slightly eccentric with respect to the center line of the valve and its actuating rod, the valve and rod can be assembled only in their proper relation. The upper wall of the valve casing 2 is suitably bored to receive an annular bushing 48 which serves as a journal for the lower end of the valve-actuating rod 46. The valve casing is provided with an enlarged counterbored portion 49 arranged concentric with the axis of the shaft 46 and having its outer end closed by means of a shouldered cover plate 50 which is provided with a centrally disposed bushing 51 which serves as a journal for the outer end of the shaft 46, the latter projecting therethrough and adapted to be rotated either manually or automatically through suitable mechanism (not shown). An annular bushing 52 surrounding the valve-operating shaft 46 is housed within the counterbore 49 of the valve casing and is suitably slotted at its lower end to engage a pin 53 inserted transversely through the valve rod 46 so that the sleeve rotates with the valve rod. A second annular sleeve 54 surrounds the sleeve 52 and is axially slidable thereon, being suitably slotted at the lower end to engage the pin 53, and the slots being of sufficient length to allow some axial movement of the sleeve relative to the shaft 46 but to restrain relative rotation therebetween. The sleeve 54 is provided at its upper end with a flange 55 which serves as a seat for one end of a coiled compression spring 56, the other end of the compression spring resting on an annular washer 57 which surrounds the lower end of the sleeve 54 and rests against the upper sides of the pin 53. The spring 56 urges the flange portion of the sleeve 54 upwardly into engagement with the under side of the cover plate 50, and the flange is provided with a toothed dog element 58 which is adapted to engage suitable teeth 59 formed on the under side of the cover plate 50, these teeth being rounded in the form of cams and forming, in conjunction with the dog 58, a well-known detent mechanism to yieldingly maintain the valve rod 46 in its various adjusted positions, the space between the respective cam-like teeth corresponding to the respective operating positions of the valve. Where the valve is operated by external power means, the detent mechanism may be incorporated in the valve operator if so desired. The details of the detent locking mechanism are best illustrated by Figs. 6 and 7.

*Operation*

The operation of the valve of Fig. 1 is as follows: With the parts in the position as illustrated in Fig. 2, the port 31 of the valve 30 is located directly beneath the bearing 16 and sealing element 42 so that all fluid flow from any one of the inlet passages 9 and 10 and the valve chamber 3 and outlet passage 7 is completely obstructed. The floating action of the valve seat 20 permits a positive seal to always be maintained between the contact faces of the valve seat 20 and valve 30, this floating action resulting from the resilient sealing element 18 and spring-pressed pressure plate 17, which permit a limited axial movement of the valve seat relative to the valve casing, as previously explained. The apertures in the valve seat 20, as noted in Fig. 2, are suitably countersunk on their upper sides to allow a firm peripheral engagement of the sealing element 18 with the bushings 14 and 16 and also with the periphery of the valve rod 46, preventing any leakage of fluid from the contact faces of the valve and valve seat axially along the bushings and valve-operating rod. The provision of the resiliently mounted floating valve seat allows a minimum of sealing pressure on the contact faces of the seat and disc valve to be employed, greatly reducing the friction torque necessary to index the valve disc from one operative position to another. The further provision of the annular thrust bearing in contact with the under side of the disc valve absorbs the forces due to sealing pressure and allows the valve to be turned with a minimum of friction, and the provision of the thrust bearing directly beneath the center line of the ports in the valve seat and disc valve allows the maximum sealing effect between the contact surfaces of the valve seat and the valve element adjacent the port openings, and further minimizes the possibility of leakage therebetween. When it is desired to allow a flow of fuel from any one of the inlet openings 9 to the outlet opening 7, the valve-actuating rod 46 is manually, or otherwise, rotated to bring the port 31 in the disc valve into registry with one of the ports 22 formed in the valve seat member 20, so that fluid may flow from the corresponding passage 10 through the respective port 22 in the valve seat port 31 in the disc valve and through the cut-away portion 31' in the thrust flange 32 to the valve chamber 3 from whence the fluid has free access to the outlet passage 7 in the cover plate 5. As the valve-actuating rod 46 is rotated from one position to another, the detent tooth 58 is forced downwardly by the high portion of a cam tooth 59 formed on the under side of the cover plate 50, forcing the sleeve 54 downward and compressing the spring 56 so that, as the valve is continued to be rotated, the spring will force the detent tooth 58 upward into the depression formed between two adjacent cam teeth 59 yieldingly restraining the valve rod against rotation and maintaining the valve disc 30 in its next adjusted position. The disc valve 30, as illustrated in Fig. 3, may be rotated to index the valve port 31 with any one of the valve ports 22 in the valve seat member 20, or to index the port 31 beneath the sealing element 42 in the position illustrated in Fig. 1, the detent mechanism being such that the valve cannot be accidentally indexed to intermediate positions.

The valve, as illustrated in Figs. 1 to 7, is of such a construction that all close-fitting parts are easily removable, and the valve seat and valve 30 may be lapped together before assembly to insure the desired positive sealing engagement between the contact faces thereof, and the provision of the floating or resilient support for the valve seat member insures the maintenance of a positive seal, yet allows for any slight misalignment of the valve disc relative to the valve seat member and requires no universal connection between the valve-actuating rod and the corresponding disc valve, as formerly employed in the prior art devices. To further simplify the valve construction and reduce the number of required parts, a modified construction of the valve of Fig. 1 will now be described.

Referring to Fig. 8, which illustrates a modified form of the valve of Fig. 1, it will be noted that this modification differs from that previously described only in that the resilient sealing element 18', replacing the sealing element 18 in the device of Fig. 1, is made of such a thickness and of such a resilient character that it combines the function supplied by the pressure plate 17 and springs 25 of the device of Fig. 1 in combination with the normal sealing function of the seal 18. In the modification, Fig. 8, the bushing 16 is used only as a guide, and the opening 24 cooperating therewith is cut only partially through the valve seat member 20 so that on assembly a sufficient clearance is provided between the bottom of the blind opening 24 and the lower end of the bushing 16 to allow the necessary limited axial movement of the valve seat relative to the valve housing to thereby obtain the same floating movement of the valve seat as is obtained in the previously described construction. The operation of the device of Fig. 8 and other constructional features thereof are identical with that of the previously described form of the invention.

Figures 9, 10, 11, 12:
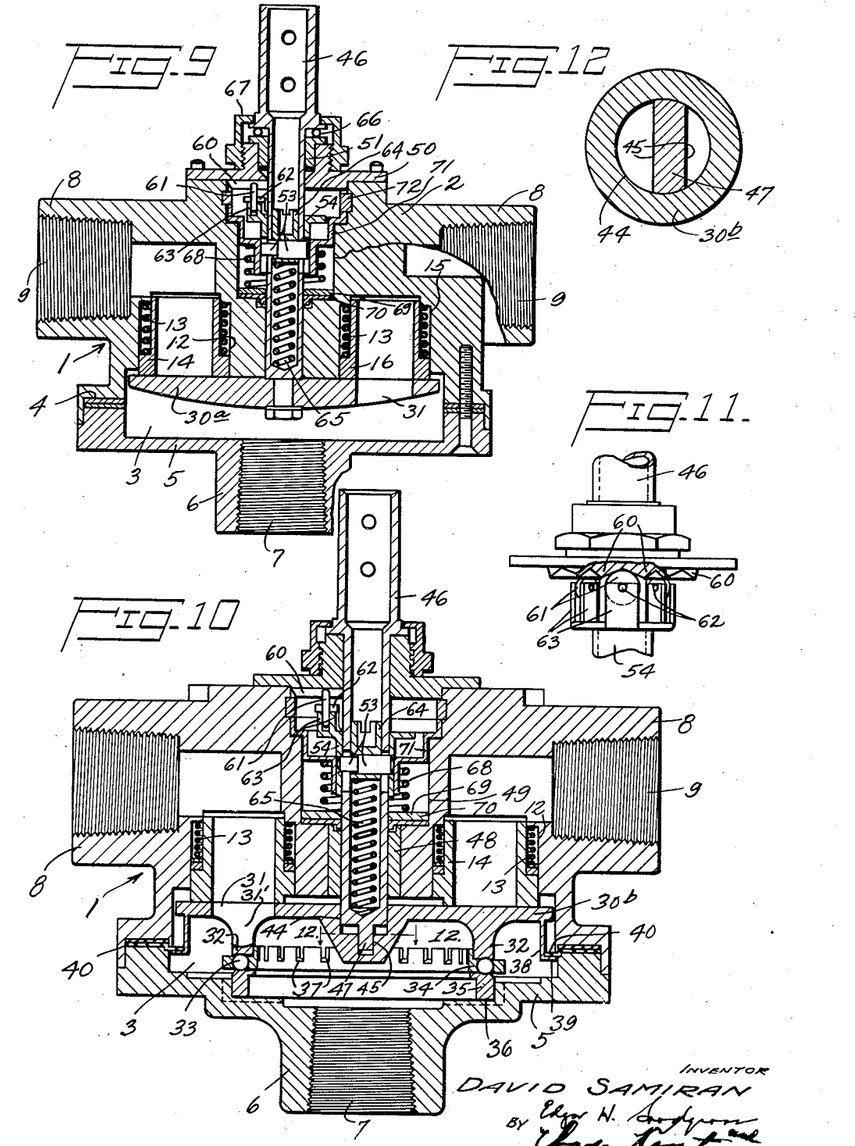
Figs. 9 and 10 are sectional views of two other modified forms of my selector valve.
Fig. 11 is a side elevation of an indexing device of the valve structure shown in Fig. 10.
Fig. 12 is a sectional view on the line 12—12 of Fig. 10 showing an operative connection between the shaft and the selector disc of the valve structure.

Referring to Figs. 9 and 10, which illustrate modified forms of the valve thus far described, it will be noted that the discs 17, 18, and 20 have been omitted and that sleeves or tubular pistons 14 of shouldered construction are provided. The sleeves 14 are slidable in the counterbores 12 and contact directly on their lower ends with the valve discs 30ª and 30ᵇ, respectively. Springs 13 are provided in the counterbores and engage the shoulders of the sleeves or pistons 14 to urge them into sealing engagement with the back surface of the disc 30ª or 30ᵇ, as the case may be.

Instead of the indexing means heretofore described, the indexing means in Figs. 9, 10, and 11 consists of a cam lobe 60 for each inlet, including the blind inlet, and a roller 61 for coaction with the cam lobes. The roller 61 is carried on a pin 62 supported by a pair of ears 63 of the sleeve 54. The cross pin 53 is shouldered and extends through a plug 64 located within the bore of the shaft 46. A spring 65 is interposed between the closed lower end of the shaft 46 and the plug 64. The spring 65 accordingly urges the roller 61 toward engagement with the cam lobes 60.

Although I have referred to a roller 61, I preferably provide at least three such rollers for the purpose of balancing the thrust on all sides of the sleeve 54 to prevent it from binding. The pin 53 is shouldered or has portions of different size so as to insure coaction thereof with the sleeve 54 in only one position with relation to the shaft 46. This insures proper positioning of the roller 61 with respect to the inlets 9.

In Figs. 9 and 10, instead of having the pressure disc 42 of the previous figures at the blind inlet, a sleeve 16 in a bore 15 and surrounded by a spring 13 similar to parts 14, 12, and 13 at the liquid inlets, is provided.

Referring specifically to Fig. 9, the disc 30ª is not supported by ball bearings 33 in the manner thus far described in connection with Figs. 1 to 8, and 10, but is supported by the shaft 46, which in turn is supported by a thrust bearing 66. Such support by the thrust bearing is in opposition to downward movement of the disc caused by the bias of the springs 13 and 65. The thrust bearing 66 is contained in a closure nut 67 screwed onto the cover plate 50. This form of the invention also omits the shroud 38 and its flange 39 with the sealing disc 40 engaging it, as in Figs. 1 to 8, and 10.

Within the bore 49 of the valves of Figs. 9 and 10, I provide means for sealing around the shaft 46 in the form of a spring 68, a washer 69, and a resilient washer 70. The spring 68 at its upper end is seated against an insert 71 mounted in the bore 49 and retained therein by a ring 72 and the cover plate 50. In the indexing means of these two figures, the peaks of the cam lobes 60 are sharp so that the rollers 61 will not stop in an intermediate position, and due to the action of the spring 65 the rollers will find their seats between two adjacent lobes, as shown in Fig. 11. Thus, after the pilot rotates the shaft 34 slightly more than half way from one inlet position to the next, the V cam and roller means will effect the remaining portion of the movement and stop such movement at accurately aligned positions of the opening 31 with respect to the tubular pistons 14.

My valve structure eliminates the tapered surfaces of some types of valves which are likely to stick and require fine adjustment for sealing purposes, and eliminates any possibility of the pressure of the fuel so acting upon the rotary member of the valve that it resists rotation to an undesirable degree. Also, there is provided a valve structure in which turbulence is minimized, particularly with the type shown in Fig. 9, and an effective seal is provided between all parts at all positions of the valve.

Although I have described my valve structure as having a plurality of inlets and a single outlet, it may be reversed in use as when fluid from a single source is supplied to the opening 7 and distributed as desired to the openings 9, the opening 7 thereby becoming an inlet and the openings 9 becoming outlets. In the appended claims, it is to be understood that specific reference to inlets and outlets does not restrict their scope to such an extent as to preclude them from covering my selector valve when used in such reversed manner.

While only preferred forms of the invention have been illustrated in the drawings, it will become apparent to those skilled in the art that many changes and variations may be made therein, falling within the scope of the invention as defined by the appended claims.

I claim:

1. In a multiple-way valve, a valve body provided with a cylindrical valve chamber, a valve seat member floatingly mounted in said chamber and having a plurality of ports therein concentrically arranged with respect to the longitudinal axis of said chamber, a plurality of inlet passages in said valve body each in communication with a respective one of said ports, a resilient seal interposed between said valve seat member and said valve body to permit of such floating movement of said valve seat member relative to said valve body, an outlet passage communicating with said chamber, a valve disc rotatable in and rigidly fixed against axial movement with respect to said valve body, said valve disc sealingly engaging said valve seat member under the bias of said resilient seal and having a single opening therein adapted to be rotated into register with any one of the ports in said valve seat member to permit fluid flow from any one of said inlet passages to said outlet passage, and operating mechanism operable from external of said valve body for rotating said valve disc.

2. The structure as claimed in claim 1, in which annular bushings are provided extending within the inlet openings in said valve body and partially extending into the ports of said seat member to thereby prevent rotation of said valve seat member relative to the valve body and to serve as a guide to permit limited axial movement of said valve seat member, said bushing members extending through said resilient seal.

3. In a multiple-way valve, a valve body provided with a cylindrical valve chamber, a valve seat member in said chamber having a plurality of ports therein concentrically arranged with respect to the longitudinal axis of said chamber, a plurality of inlet passages in said valve body each in communication with a respective one of said ports, a resilient seal interposed between said valve seat member and said valve body to permit a floating movement of said member relative to said valve body, an outlet passage communicating with said chamber, a valve disc sealingly engaging said valve seat member and having a single opening therein adapted to be rotated into register with any one of the ports in said valve seat member to permit fluid flow from any one of said inlet passages to said outlet passage, operating mechanism operable from external of said valve body for rotating said valve disc, a pressure plate interposed between said valve body and said resilient seal, resilient means for applying a loading pressure to said pressure plate to maintain a fluid tight seal between the contact faces of said valve seat member and said valve disc, and a ball thrust bearing supported by said valve body and engaging said valve disc opposite the contact side thereof to absorb the thrust on said valve member due to sealing and fluid pressures.

4. A multiple-way valve including a housing having a central chamber and a plurality of inlet passages therein, an annular valve seat member floatingly mounted in said chamber and having a plurality of ports each in communication with a respective one of said inlet passages, resilient means interposed between said valve seat member and said housing to permit a limited amount of such floating movement of said valve seat member, a rotatable disc valve having one face thereber in sealing contact with said valve seat, a single passage in said valve disc adapted to be rotated into registry with any one of the ports in said valve seat member to allow fluid flow therethrough into said chamber or movable to obstruct fluid flow into said chamber, an outlet opening in said casing communicating with said chamber, a valve-operating element extending through said casing and valve seat member concentric with the longitudinal axis of the chamber, an operative connection between said operating member and said disc valve, and a ball thrust bearing secured against axial movement within the housing and engaging said disc valve to absorb thrust loads exerted thereon and to fix the position of the disc valve axially in said housing.

5. In a valve of the character described, a valve casing having a central chamber provided with inlet and outlet openings, an annular ported valve seat member in said chamber, said member being non-rotatable but axially movable in said chamber, a ported disc valve element cooperating with said valve seat to permit or cut off the flow of fluid from the inlet to the outlet of said chamber through said ports, resilient means in said casing for yieldingly urging said valve seat member into sealing engagement with one face of said valve element, a thrust bearing contacting the opposite face of said valve element, said thrust bearing engaging a rigid portion of said valve casing to fix said valve element against axial movement in the casing and for transmitting the thrust exerted thereon directly to the casing, and a valve-operating member extending through said casing and annular valve seat member and operatively connected to said disc valve element to impart rotary movement thereto.

6. In a valve of the character described, a valve casing having a central chamber provided with inlet and outlet openings, an annular ported valve seat member in said chamber, said member being non-rotatable but axially movable in said chamber, a ported disc valve element cooperating with said valve seat to permit or cut off the flow of fluid from the inlet to the outlet of said chamber through said ports, resilient means in said casing for yieldingly urging said valve seat member into sealing engagement with one face of said valve element, a thrust bearing contacting the opposite face of said valve element for absorbing the thrust exerted thereon, a valve-operating member extending through said casing and annular valve seat member and operatively connected to said disc valve element to impart rotary movement thereto, a resilient sealing element provided between said valve casing and said valve seat element, said sealing element preventing fluid leakage between the valve casing and the valve seat member but allowing a limited axial movement of the latter, and said sealing element also being in peripheral contact with said valve-operating member to prevent fluid leakage axially therealong.

7. The structure as claimed in claim 5, in which detent mechanism is provided for yieldingly maintaining said valve-operating member in certain adjusted positions.

8. A valve comprising in combination a valve body having a first fluid passage therein, a ported valve seat member in said body axially movable but nonrotatable with respect to said valve body, the port in said valve seat communicating with said first fluid passage, a ported rotatable valve element in said valve body cooperating with said valve seat member and retained against axial movement in said valve body, a second fluid passage in said valve body adapted to be placed in communication with said first fluid passage upon registry of said ports, yielding means for urging said valve seat axially into fluid sealing relation wtih said valve element, and means for imparting rotary movement to said valve element from external of said valve body.

9. The structure as claimed in claim 8, including a resilient sealing member located between said valve body and said valve seat member to prevent fluid leakage therebetween, but to allow a limited axial movement of said valve seat member relative to said valve body.

10. The structure as claimed in claim 8, including a thrust bearing mounted against axial movement in said valve body and cooperating with said valve element to transfer the axial thrust exerted thereon directly to said valve body.

11. A multiple-way valve comprising a valve casing having a cylindrical chamber therein, a plurality of fluid inlet passages in said casing communicating with said chamber through one end wall thereof, a removable cover plate having an outlet passage therein and forming the other end wall of said chamber, a bore in said casing extending through the said one end wall of the chamber, a valve-actuating rod in said bore, an annular valve seat member in said chamber and arranged concentric with said valve-actuating rod, a plurality of openings in said member arranged radially equidistant with respect to the axis of said chamber, a plurality of annular bushings projecting through the said one end wall of said casing and extending at least partially within the openings in said valve seat member to permit guided axial movement of said seat member but to restrain rotation thereof relative to said casing, certain of said bushings being in communication with respective ones of said inlet passages, a disc valve having a single opening therein connected to said actuating rod, said valve opening adapted to be rotatably positioned into register with any one of the openings in said valve seat, a yielding sealing element interposed between said valve seat member and said casing, a pressure plate interposed between said sealing element and said casing, resilient means mounted within said casing for applying a force on said pressure plate to urge said valve seat member into sealing contact with said valve, and an annular thrust bearing mounted in said cover plate and engaging said valve on the side opposite the contact face thereof to resist the thrust of the sealing pressure exerted thereon.

12. The structure as claimed in claim 11, in which one of said annular bushings is located so as to register with the port in said valve when the latter is rotated to the "off" position, said bushing having a spring-pressed sealing disc therein which projects through the corresponding opening in said seat member, said sealing disc being adapted to cover the port in said valve member when the latter is moved to the "off" position to interrupt communication between any one of the inlet passages and said outlet passage.

13. The structure as claimed in claim 11, in which the disc valve is provided with an annular shoulder concentric with the axis of the valve-actuating rod and in contact with said annular thrust bearing, the circumferential median line of said flange being coplanar with the centers of said openings in the valve seat member and disc valve to insure a positive sealing engagement between said valve seat and said disc valve adjacent the respective openings therein.

14. The structure as claimed in claim 11, in which said casing and said valve-actuating rod are provided with cooperating yielding indexing elements to insure the retaining of said valve in its respective adjusted positions.

15. In a valve having a housing with a valve chamber therein provided with fluid-entrance and -exit openings, a yieldingly supported non-rotatable valve seat member in said chamber having a port therein in communication with one of said openings, a rotatable disc valve supported in said chamber against movement normal to the plane thereof and adapted to engage said valve seat in fluid-sealing relation, a ported opening in said disc valve adapted to be indexed into positions permitting or obstructing fluid flow between the entrance and exit openings in said casing, and means acting on said valve seat member to move it axially relative to said housing and thereby maintain a sealing pressure on the contact surfaces of said disc valve and said valve seat member.

16. In a selector valve structure, a hollow valve body having a fluid outlet and a plurality of fluid inlets, one of said inlets being blind, a disc between said outlet and said inlets and having an opening for selectively registering with said inlets, a ball race between said body and said disc on the outlet side of the disc, each of said inlets having a cylindrical bore normal to the inlet face side of said disc, a tubular piston in each of said cylindrical bores, sealing means between the exterior of each tubular piston and the interior of its respective cylindrical bore, springs to retain said sealing means in sealing coaction with said cylindrical bores and said tubular pistons, said ball race opposing the movement of said disc under influence of said springs, a shaft extending from said disc to the exterior of said valve body for rotating said disc, sealing means for sealing said shaft relative to said body, spring means effecting compaction of said last sealing means, and indexing means of roller and V cam type for positioning said disc in accurate alignment of its opening with relation to said inlets of said valve body.

17. In a selector valve structure, a hollow valve body having an outlet and a plurality of inlets, a disc between said outlet and said inlets and having an opening for selectively registering with said inlets, a ball race between said body and said disc on the outlet side of the disc, each of said inlets having a cylindrical bore normal to the face of said disc, a tubular piston in each of said cylindrical bores and engaging the inlet face side of said disc, springs to retain said tubular piston in engagement with said disc, said ball race opposing the movement of said disc under influence of said springs, a shaft extending from said disc to the exterior of said valve body for rotating said disc, and indexing means of roller and V-cam type for positioning said disc in accurate alignment of its opening with relation to the inlets of said valve body.

18. A selector valve structure comprising a hollow valve body having an outlet and a plurality of inlets, a disc between said outlet and said inlets and having an opening for selective registration with said inlets, a rolling type bearing between said body and said disc, said bearing fixing said disc axially with respect to said valve body, each of said inlets having a cylindrical bore normal to the face side of said disc on the inlet side thereof, a tubular piston in each of said cylindrical bores, means biasing said tubular pistons to engage said disc in opposition to said bearing, and an operating shaft for said disc and sealed relative to said valve body.

19. In a selector valve structure of the character described, a valve body having a plurality of inlets, a cover plate for said valve body, said cover plate having an outlet, a disc enclosed in said valve body by said cover plate and located between said inlets and said cover plate, said inlets each having a cylindrical bore and one of said inlets being blank, said disc having an opening for selective registration with said cylindrical bores, a tubular sealing piston in each bore and having a shoulder facing the inlet, a sealing ring against said shoulder and contacting with the outer surface of said tubular piston and the inner surface of the bore, a spring in each bore bearing against said sealing ring to cause sealing engagement thereof with the bore and the piston and to bias the piston toward the face of the disc, means for supporting said disc in opposition to said springs, a shaft for rotating said disc, said valve body having a bore for said shaft, sealing means for said shaft, indexing means to position said disc in accurately selected alignment with said inlets, said indexing means comprising a sleeve slidable on said shaft, a cover plate for the indexing means having cam lobes provided with inclined sides and V-shaped peaks, said sleeve having a roller for coaction with said cam lobes, said shaft having a slot, a cross pin therethrough and connected with said sleeve, and a spring within a bore of said shaft and engaging said cross pin to bias said roller toward said cam lobes.

20. In a selector valve structure, a valve body having a plurality of inlets, a cover plate for said valve body having an outlet, said valve body having a bore, a shaft through said bore, a disc on the inner end of said shaft between said inlets and said outlet, said disc having an opening for selective registration with said inlets, one of said inlets being blank, each of said inlets having a cylindrical bore, a tubular piston slidable in each of said cylindrical bores and engageable with one face of said disc, sealing means between said tubular pistons and said bores, spring means for compacting said sealing means and urging said tubular pistons toward said disc, a thrust bearing for said shaft carried by said valve body to support said disc against axial movement relative to said valve body and in opposition to movement by said springs, sealing means in said valve body for said shaft at the point where it extends through said bore.

DAVID SAMIRAN.